(12) United States Patent
Schiller

(10) Patent No.: US 6,341,660 B1
(45) Date of Patent: Jan. 29, 2002

(54) SWINGING ARM MOTOR UNIT FOR SINGLE-TRACK OR MULTIPLE-TRACK ELECTRIC MOTOR DRIVEN VEHICLES

(76) Inventor: Helmut Schiller, Scholzenviertel 7, Bensheim-Zell (DE)

( * ) Notice: Subject to any disclaimer, the term of this patent is extended or adjusted under 35 U.S.C. 154(b) by 0 days.

(21) Appl. No.: 09/445,322

(22) PCT Filed: Jun. 9, 1998

(86) PCT No.: PCT/EP98/03464

§ 371 Date: Dec. 6, 1999

§ 102(e) Date: Dec. 6, 1999

(87) PCT Pub. No.: WO98/56647

PCT Pub. Date: Dec. 17, 1998

(30) Foreign Application Priority Data

Jun. 12, 1997 (DE) .......................... 197 24 689
Nov. 20, 1997 (DE) .......................... 197 51 371

(51) Int. Cl.⁷ ............................................. B62D 61/02
(52) U.S. Cl. .................. 180/220; 180/65.6; 180/68.1; 180/357
(58) Field of Search .............. 180/220, 68.5, 180/65.1, 65.3, 65.5, 65.6, 68.1, 342, 343, 357, 358, 376, 383, 311

(56) References Cited

U.S. PATENT DOCUMENTS

| | | | | |
|---|---|---|---|---|
| 4,406,342 A | * | 9/1983 | Lacroix ....................... | 180/220 |
| 4,410,060 A | * | 10/1983 | Cunard ....................... | 180/220 |
| 4,846,260 A | | 7/1989 | Maas .......................... | 165/47 |
| 5,222,572 A | * | 6/1993 | Yamagiwa et al. .......... | 180/220 |
| 5,406,154 A | * | 4/1995 | Kawaguchi et al. ........ | 180/220 |
| 5,421,427 A | * | 6/1995 | Ogawa et al. ............... | 180/220 |
| 5,489,002 A | | 2/1996 | Streiff ....................... | 180/65.3 |
| 5,613,569 A | * | 3/1997 | Sugioka et al. ............. | 180/220 |

FOREIGN PATENT DOCUMENTS

| | | |
|---|---|---|
| DE | 822212 | 11/1951 |
| DE | 887917 | 8/1953 |
| DE | 948207 | 8/1956 |
| DE | 3605703 | 4/1988 |
| DE | 4213132 | 11/1992 |
| DE | 4406245 | 1/1995 |
| DE | 19601918 | 8/1996 |
| DE | 29622811 | 6/1997 |
| DE | 29606474 | 9/1997 |
| FR | 2533287 | 9/1983 |
| FR | 2706369 | 6/1993 |
| JP | 5323411 | 3/1978 |
| WO | 9718125 | 5/1997 |

* cited by examiner

Primary Examiner—J. J. Swann
Assistant Examiner—F. Zeender
(74) Attorney, Agent, or Firm—Norris, McLaughlin & Marcus P.A.

(57) ABSTRACT

A propulsion unit rotating shaft (10) for single track or multiple track vehicles, driven by an electric motor, particularly for motor scooters with a driving motor (14), which is disposed in the region of one end of an extended rotating shaft housing (12) and constructed as an electric motor, and a hub (16), which is mounted rotatably in the region of the other end of the rotating shaft housing and is intended to hold a driving wheel (18) of the vehicle. The driven shaft of the driving motor (14), which is passed into the rotating shaft housing (12), is positively coupled with the wheel hub (16) of the driving wheel of the vehicle by a transmission device (26), encapsulated in the housing for the rotating shaft, and facilities are provided for the pivotable mounting of the housing (12) of the rotating shaft about an axis at a distance from the axis of rotation of the wheel hub (16) and extending parallel to it at or in the frame or chassis of the motor-driven vehicle. In the transmission train between the driving motor (14) and the wheel hub (16), at least one overriding clutch (38a, 38b) is provided, which cancels the positive coupling between the drive shaft of the driving motor and the driving wheel (18) of the vehicle, when the driving moment, initiated in the transmission device (32) by the driving motor (14), is smaller than a torque, acting from the driving wheel (18) of the vehicle over the wheel hub (16) on the transmission device.

15 Claims, 3 Drawing Sheets

SWINGING ARM MOTOR UNIT FOR SINGLE-TRACK OR MULTIPLE-TRACK ELECTRIC MOTOR DRIVEN VEHICLES

BACKGROUND OF THE INVENTION

The invention relates to a propulsion unit rotating shaft (also called a swinging arm motor unit) for single track or multiple track vehicles, driven by an electric motor, particularly for motor scooters and light vehicles for transporting persons or goods, etc., with a driving motor, which is disposed in the region of one end of an extended rotating shaft housing (also called a swinging transmission housing) and constructed as an electric motor with a largely closed housing, and a hub, which is mounted rotatably in the region of the other end of the rotating shaft housing and is intended to hold a driving wheel of the vehicle, the drive shaft of the driving motor, which is passed into the rotating shaft housing, being positively coupled with the wheel hub of the driving wheel of the vehicle by a transmission device, encapsulated in the housing for the rotating shaft and the rotating shaft housing having facilities for the pivotable mounting about an axis at a distance from the axis of rotation of the wheel hub and extending parallel to it at or in the frame or chassis of the motor-driven vehicle, and at least one overriding clutch being provided, which cancels the positive coupling between the driving motor and the driving wheel of the vehicle, when the driving moment, initiated by the driving motor in the transmission device, is smaller than a torque, acting from the driving wheel of the vehicle over the wheel hub on the transmission device.

Such propulsion unit rotating shafts, which represent an integral structural unit of a driving motor, a rotating shaft housing accommodating a transmission unit and a hub, which is intended for holding the driving wheel, is mounted in the rotating shaft housing and coupled over the transmission device with the driving mechanism of the driving motor, are used especially for two wheel vehicles of lower power, such as motor scooters, but also for three- and four-wheel vehicles, such as carts, golf carts, etc. Moreover, internal combustion engines are used almost exclusively at the present time as driving motors and, because of their particular torque characteristics, require gears in the transmission, which permit the step-up ratio between the motor drive and the driving wheel to be varied continuously or in several steps. Such infinitely variable or multistep gears necessarily have an appreciable weight and, depending on the construction and in comparison to the driving power generated by the driving motor decrease, due to transmission losses (friction, etc.), the driving power available at the driving wheel. Aside from the unfavorable performance or torque characteristics, the internal combustion engines also have further disadvantages, which lie, for example, in their complex construction, as well as in the emission of environmentally harmful exhaust gases and the generation of disturbing noise.

The use of electric motors as driving motors, which has been proposed already earlier for heavier passenger cars and for trucks, has in the past not been able to gain acceptance although, with respect to their available torque characteristics, electric motors were more advantageous than internal combustion engines. For the driving performance required, they were even able to bring about a small saving in weight which, however, was converted into an unfavorable ratio due to the weight and the space required by storage system (accumulators, batteries, etc.) for the electrical energy required for driving the motors. In comparison to vehicles driven by internal combustion engines, vehicles driven by electric motors were heavy and, as a result of the limited capacity of the electrical storage system, had only short, usable range. The service life of the electrical storage system was also unsatisfactory.

For electric motors, as well as for electric accumulators, recent developments have led to improvements, which have lessened previously existing disadvantages. For example, dc motors in the form of "axial field motors" (WO 95/17779) have been developed which, because of their special construction, make available high driving moments already at a low rpm and, moreover, can be controlled over a larger range of rpm. In the sector of electric accumulators, the long-known lead accumulators, as well as the accumulators working with new electrode materials, have been developed further and have more advantageous values not only with respect to the weight to capacity ratio, but also with respect to the charging times required. The service life was also improved. Electric vehicles and especially motor scooters of the initially mentioned type (WO 97/18125 A2) have already been proposed, but have not yet led to marketable products.

SUMMARY OF THE INVENTION

It is an object of the invention to provide a propulsion unit rotating shaft for special low performance, motor-driven vehicles, for which the advantages of the electrical driving mechanism come to the fore and the previously existing disadvantages are clearly reduced.

Starting out from a propulsion unit rotating shaft of the initially mentioned type, this objective is accomplished pursuant to the invention owing to the fact that the transmission device has at least two transmission trains, which are connected in series, and that the or one of the free-running hubs is connected between the two transmission trains. This arrangement of the free-running hubs between two transmission trains connected in series has advantages with respect to the accessibility of the free-running hub and, with that, to its maintenance, as well as with respect to the load placed upon it due to the decrease in the rpm of the revolving part of the free-running hub, which continues to be coupled with the driving wheel in pushing operation, in comparison with the free-running hub disposed on the motor side.

A further overriding clutch may also be disposed in the driving motor itself, before the latter is connected with the transmission device, for example, between the rotor hub and the driven shaft. This free-running hub coupling is then an integral part of the driving motor.

In a further advantageous development of the invention, several overriding clutches may be provided, of which one may be provided in the coupling region between the driving motor or, as previously mentioned, in the driving motor and the transmission and the other in the region between the transmission device and the wheel hub.

It is advisable to dispose the electric motor at the rotating shaft housing with the axis of rotation parallel to the wheel hub for the driving wheel of the vehicle. In this case, the device for the pivotable mounting of the rotating shaft housing in or at the frame or chassis of the associated vehicle is constructed, so that the axis of rotation of the driving motor and the pivoting axis of the propulsion unit rotating shaft essentially coincide or have only a slight distance from one another. During the horizontal sweep of the propulsion unit rotating shaft which, because it is supported at the chassis or frame over a spring or a shock-absorbing leg, at the same time assumes the function of the suspension of the driving wheel of the vehicle, the driving motor only carries out a horizontal sweep motion, that is, it does not change its height position. As a result, the effect of the weight of the driving motor on the spring action is minimized.

The driving motor of the inventive propulsion unit rotating shaft preferably is constructed as a so-called axial field motor, which has the previously described advantageous properties with respect to the advantageous course of the torque and with respect to the range of the rpm, which can be controlled. The use of electric motors of other constructions also comes into consideration.

As a result, it is possible to construct the transmission device without interposing step-down gears or step-up gears as a simple non-positive or positive transmission train, such as a belt drive or a chain drive, as a result of which there are no transmission losses due to step-down steps or gear steps.

The housing of the electric motor advantageously is constructed largely closed, an inlet and an outlet being provided, so that cooling air can flow through. At least the inlet advisably is preceded by a filter for the cooling air, in order to prevent penetration of and contamination by dust particles, especially also penetration of metallic particles into the motor.

The inlet for the cooling air and the filter device provided there are advantageously disposed in vehicles with the inventive propulsion unit rotating shaft as high as possible, in order, to filter out contaminating particles and to exclude access of water as well, when driving through water or heavy thunder showers. This arrangement is of advantage also with respect to the inlet temperature of the cooling air since, in unfavorable cases, the air temperature directly over the asphalt street surfaces, strongly heated by radiation from the sun, can lie appreciably above the actual ambient temperature. When the propulsion unit rotating shaft is used in single track vehicles, such as motor scooters, the space immediately below the bench seat is available for this purpose.

The free-running hub itself can be constructed as a known clamp or sleeve-type overriding clutch which, while being small in size and having a corresponding low weight, functions reliably and has a reliable service life.

If propulsion unit rotating shafts, constructed in the inventive manner, are to be used as driving units for multitrack vehicles, such as carts, motorized rickshaws, golf carts, etc., for which a motorized reverse driving mechanism is desirable or necessary, devices for optionally blocking the free-running hub function of the free-running hub or hubs are advantageously provided. This embodiment permits a reverse driving mechanism after blockage of the free-running hub function by switching over the connecting of the electrical motor. A separate mechanical gear step as a reversing gear is then not required.

When the inventive propulsion unit rotating shaft is used as a driving mechanism for a motor scooter with a metal profile frame, which carries the steering head for the front wheel suspension at the front end and for which the frame has two metal profiles, which are at a distance from one another transversely to the driving direction of the scooter and constructed as closed tubular profiles, which are brought together in the region of the steering head and fastened, are taken from the steering head in each case diagonally towards the outside and in the downwards direction as far as below the level of the footrest platform of the scooter, then in a parallel distance from one another approximately horizontal into the region of what is the rear end of the footrest platform in the driving direction and from there once again in the upwards direction as far as approximately the level of the seat or the bench seat of the scooter and, between the drawtubes of metal profiles, spaced apart in the driving direction, seats are provided for the electrical storage system or systems, the embodiment advisably is such that, at least the seats for the current storage systems, provided in the region of the parallel, horizontal metal profile sections, which are at a distance from one another, have a tub, which is fastened to the metal profile sections and not only shields the electrical storage system against wetness, becoming dirty or stone impact from the street side, but additionally contributes to stiffening the frame.

The metal profiles advisably are constructed as a rectangular or a flat, half-round tubular profile of steel or light metal.

BRIEF DESCRIPTION OF THE DRAWINGS

The invention is explained in greater detail in the following description in conjunction with the drawing, in which.

DETAILED DESCRIPTION OF THE INVENTION

Figure 1:
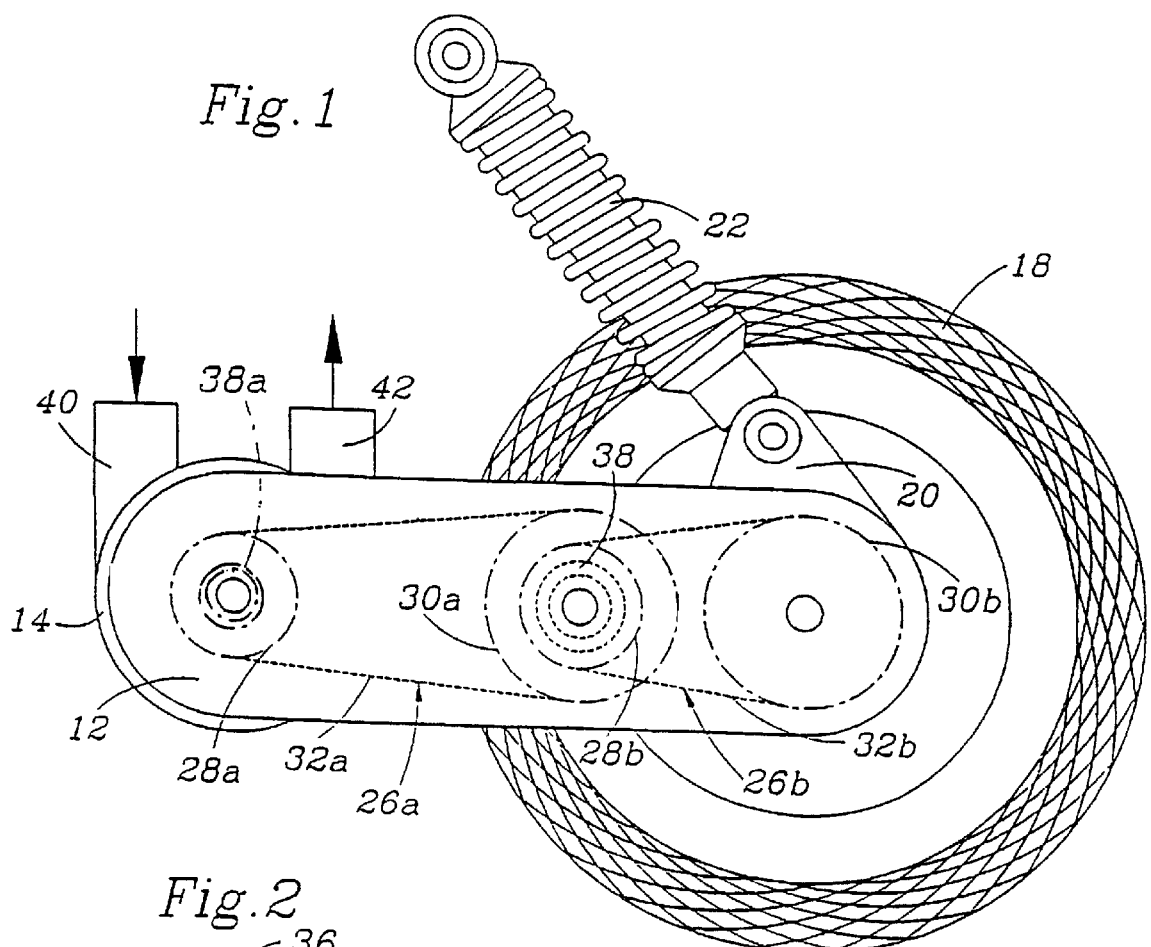
FIG. 1 shows a side view of an inventive propulsion unit rotating shaft with an installed driving wheel in a representation illustrating approximately the installed position in a vehicle, with a shock-absorbing leg provided to support the propulsion unit rotating shaft at the assigned chassis of the vehicle.
Figure 2:
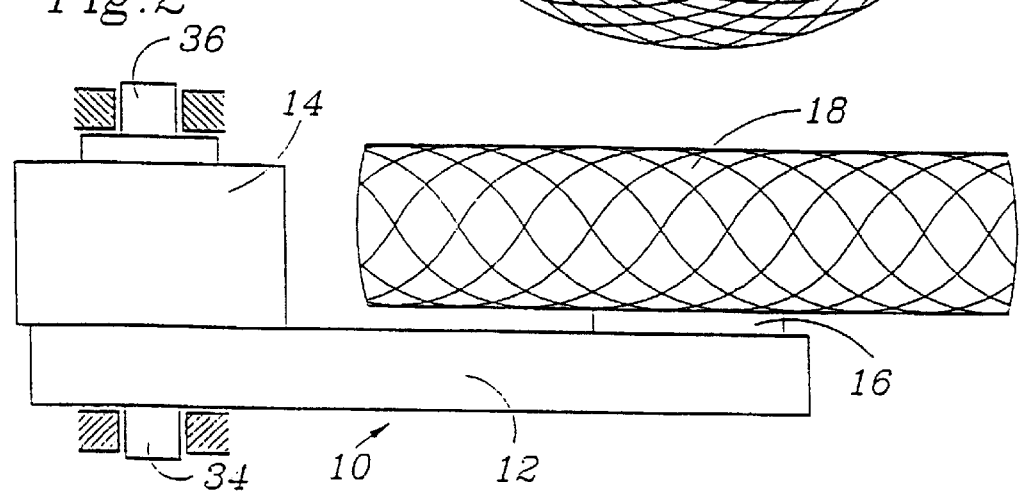
FIG. 2 shows a view of the propulsion unit rotating shaft, seen in the direction of the arrow 2 in FIG. 1.

The propulsion unit rotating shaft, shown in FIGS. 1 and 2 and labeled 10 as a whole, is a driving subassembly for vehicles driven by an electric motor, and has an electric driving motor 14 disposed in an end region of an extended rotating shaft housing 12 and a hub 16, which is rotatably mounted in the other end region of the rotating shaft housing 12 and to which the driving wheel 18 can be fastened in the usual manner by being bolted to it. The brake (not shown) for the driving wheel 18 can also be integrated at the rotating shaft housing 12 or at the wheel hub 16.

In FIG. 1, a seat 20 for the rotating shaft housing end of a shock-absorbing leg 22, supported at the upper end at the chassis or frame of an associated vehicle 22, is shown on the upper side of the rotating shaft housing 12.

In the case shown, the driving motor 14 is an electric motor of the axial field construction, which draws its driving energy from the electric power storage, such as accumulators, carried along in the associated vehicle. Because of the special properties of such electric machines, step-down gears and step-up gears between the driven shaft of the driving motor 14, taken into the interior of the housing of the rotating shaft (not shown), and the wheel hub 16, which is rotatably mounted in the housing for the rotating shaft, are not or only conditionally required, so that, for the transfer of the rotation of the driven shaft of the driving motor 14 to the wheel hub 16 and accordingly of the driven wheel 18 of the vehicle, a transmission device 26a, 26b in the form of a two-step chain, belt or toothed belt driving mechanism is sufficient. The driving wheel, which is connected with the motor shaft 14, is labeled 28a, the driven wheel, which is connected with the hub 16, is labeled 30b and the transmission elements in the form of V belts, toothed belts or chains, coupling the two wheels 28a and 30b, are labeled 32a, 32b.

In FIG. 1, the arrangement of a further overriding clutch 38a is also indicated diagrammatically by a broken line. It is to be integrated in the driving motor 14, so that the driven shaft of the latter can be coupled directly with the driving pinion or wheel 28a of the latter.

As already mentioned, the transmission device is divided into two transmission trains 26a, 26b, that is, two chain, belt or toothed belt drives, which are connected in series. Moreover, the pinion 28a is connected over a chain or a belt 32a with a chain or belt wheel 30a, which is coupled in turn with a chain or belt pinion 28b, which is coupled over a second belt, toothed belt or chain 32b with a driven chain or belt wheel 30b. For this embodiment of the transmission train, which makes the constructive realization of a strong gear reduction between the rpm of the drive shaft of the driving motor 14 and the wheel hub 16 possible, only an overriding clutch 38 is disposed in the region connecting the driven chain or belt wheel 30a with the second pinion or chain wheel 28b.

In addition, FIG. 1 shows connections 40, 42 for supplying or removing cooling air into or out of the driving motor 14, which otherwise is encapsulated completely to prevent penetration of spray water or dirt particles. The connections 40, 42 are placed at the upper side of the driving motor 14, which is directed away from the roadway, so that, when the propulsion unit rotating shaft 10 is used in a vehicle, like the motor scooter 50 described below in conjunction with FIG. 3, they discharge within the body 54 below the bench seat 56. An air filter (not shown) and/or a moisture precipitator (not shown) may be provided at least ahead of the air inlet pipelines. The electrical leads to the motor advisably are placed in the air inlet pipeline.

In FIG. 2, the pivotable mounting of the propulsion unit rotating shaft 10 by means of axle journals 34 or 36 protruding from the side of the housing 12 of the rotating shaft, averted from the motor, on the one hand, and from the side of the motor 14, averted from the housing for the rotating shaft, on the other, is indicated diagrammatically. It can be seen that the arrangement is such that the longitudinal center line of the axle journals 34 and 36 and, with that, the pivoting axis of the propulsion unit rotating shaft 10 coincides with the axis of rotation of the driving motor 14, as a result of which the affect of the mass of the driving motor 14 on the behavior of the spring system of the propulsion unit rotating shaft is kept as small as possible.

Figure 3:
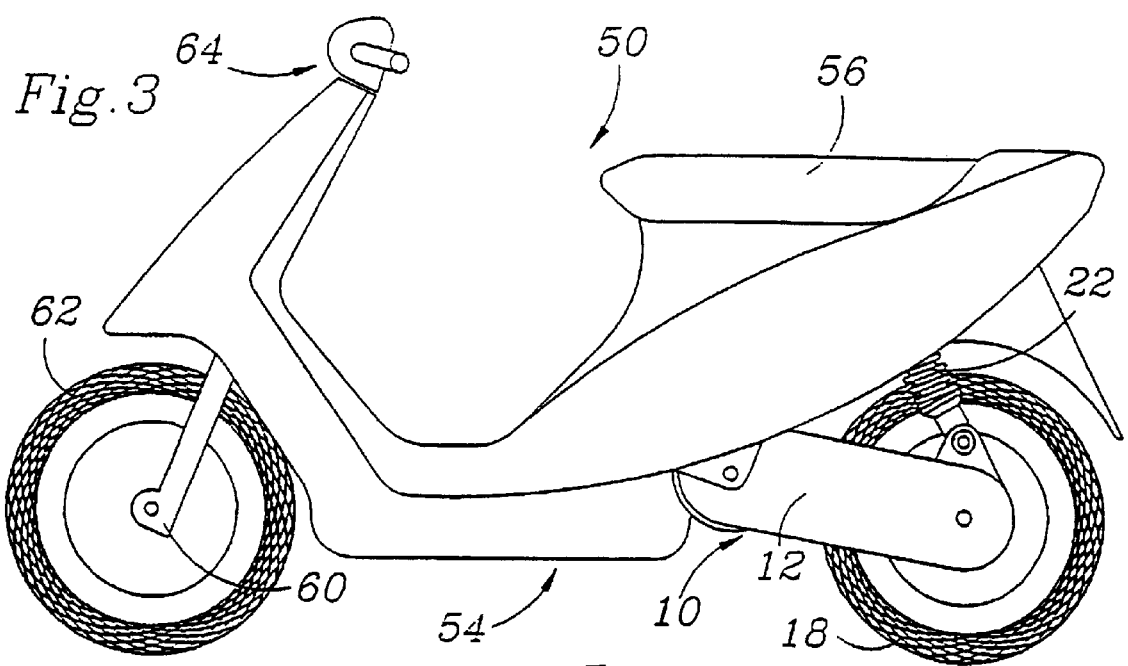
FIG. 3 shows a side view of a motor scooter equipped with the inventive propulsion unit rotating shaft.
Figure 4:
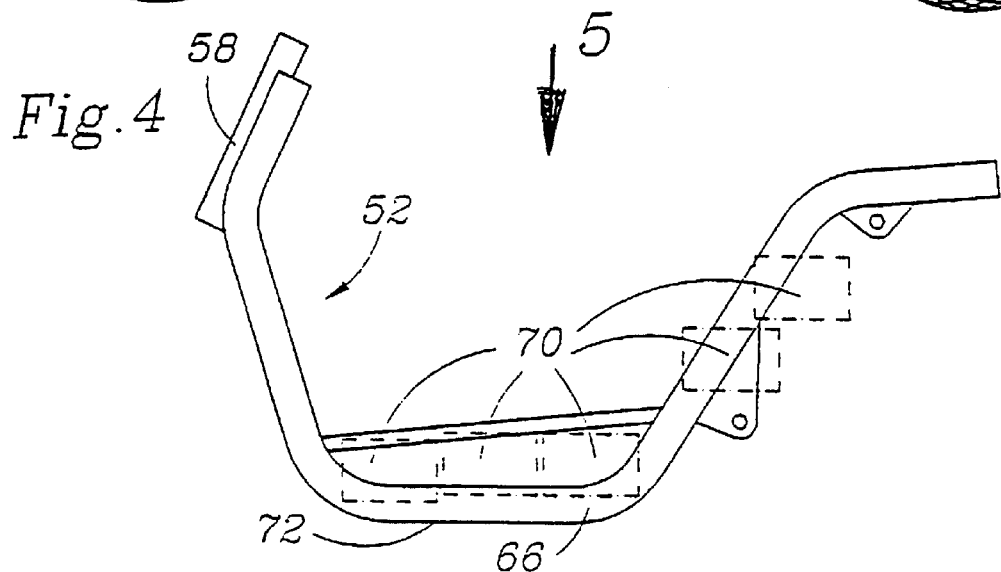
FIG. 4 shows a side view of the frame of the motor scooter of FIG. 3.
Figure 5:
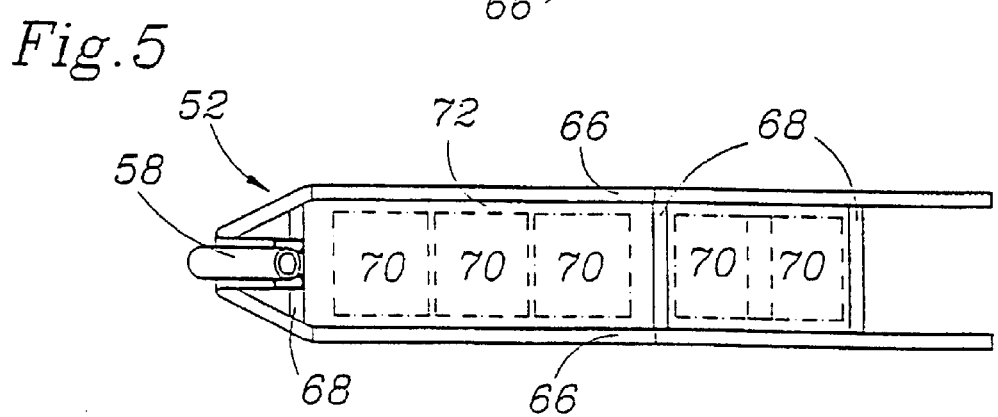
FIG. 5 shows a view of the frame, seen in the direction of the arrow 5 in FIG. 4.

In FIG. 3, a motor scooter 50 of the construction typical at the present time, the frame 52 of which, holding the propulsion unit rotating shaft is shown separately in FIGS. 4 and 5, is shown as an example of a vehicle, which can be equipped with an inventive propulsion unit rotating shaft 10. The frame is lined by the usual chassis 54 which, as a rule, is produced at the present time from plastic and, in its rear region above the propulsion unit rotating shaft, carries a bench seat 56. At the front end of the frame 52 opposite the driving wheel 18, the sleeve-shaped bearing seat of the steering head 58 of the motor scooter 51 is provided. In the case shown, the front wheel suspension, constructed as a telescoping fork 60, is mounted rotatably for the steerable front wheel 62 in this bearing seat. The handlebar 64 is disposed on the end of the steering axis, which is connected with the telescoping fork 60 and protrudes from the upper end of the steering head 58.

The frame 52 has two metal profiles 66, which are at a distance from one another transversely to the driving direction of the scooter, are constructed as closed tubular metal profiles 66, brought together in the region of the steering head 58 and fastened, for example, by welding. From the steering head 58, the metal profiles 66 proceed initially in each case obliquely to the outside and in the downward direction below the level of the footrest platform of the scooter, then at a parallel distance from one another approximately horizontally in the region of the end of the footrest platform, which is the rear end in the driving direction, and from there once again in the upwards direction approximately up to the level of the seat or bench seat 56. The rear ends of the profiles 66 are advisably connected together in order to stiffen the frame by a transverse profile 68, it being possible to provide additional transverse profiles 68 in intermediate regions for stiffening the frame further. Seats for the accumulators 70, which are indicated only by lines of dots and dashes in FIGS. 4 and 5, may also then be disposed at these transverse profiles 68. The special design of the frame 52 described enables accumulators 70 to be disposed between the metal profiles 66, which advisably are formed by rectangular, tubular or flat, half-round tubular profiles, which advisably are placed on edge. As a result, the seat between the metal profiles 66 is protected and, especially in the region of the footrest platform, can be provided in an advantageous gravitational position.

To protect the accumulators 70 against damage, a tub 72, in which the seats for the accumulators 70 intended to be placed there are formed, can be provided between the metal profiles 66.

Figure 6:
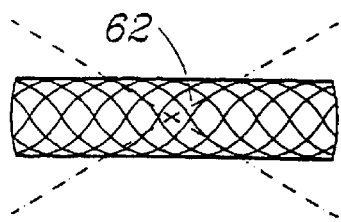
FIG. 6 shows a diagrammatic illustration of the position of the propulsion unit rotating shaft, of the driving wheel and of the front wheel when the propulsion unit rotating shaft is used in a single track vehicle, such as the motor scooter shown in FIG. 1.
Figure 6:
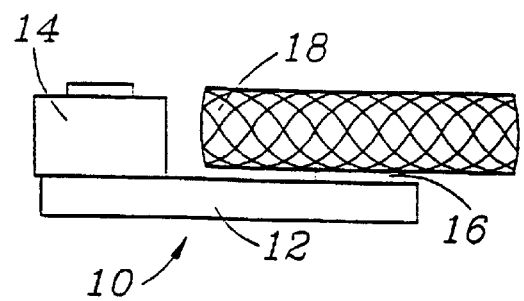

The relative position of the propulsion unit rotating shaft 10 with the driving wheel 18 in relation to the steerable front wheel 66 in the case of the motor scooter 50 of FIG. 3 is also illustrated in FIG. 6. It can be seen that the front wheel 66 and the driving wheel 18 are aligned in the driving direction.

Figure 7:
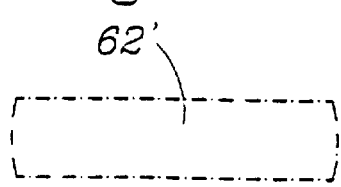
FIG. 7 shows a diagrammatic illustration of the arrangement and position of two inventive propulsion unit rotating shafts in a multitrack vehicle, corresponding to FIG. 6, the position and arrangement of the front wheel of a three-track vehicle, such as a cart being shown and the alternative arrangement of two parallel, steerable front wheels for the embodiment as a two-track vehicle being shown by lines of dots and dashes.
Figure 7:
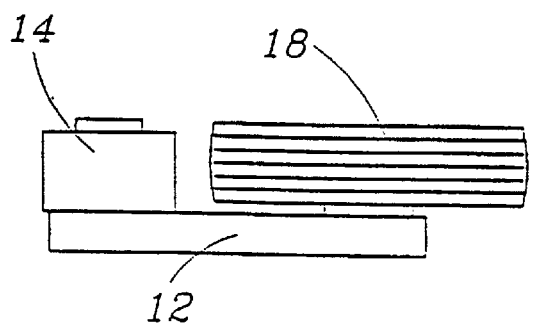
Figure 7:
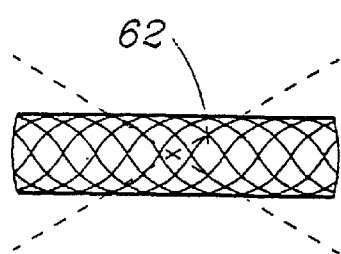
Figure 7:
Figure 7:
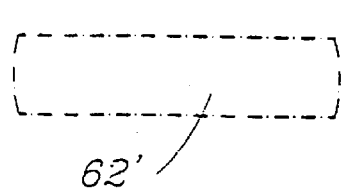
Figure 7:
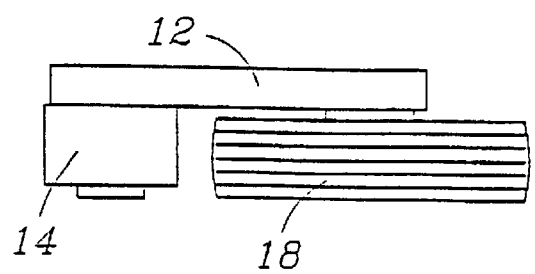

The use of, in the present case two, inventive propulsion unit rotating shafts 10 in multi-track vehicles is illustrated in FIG. 7. The construction is such that, symmetrically to the vertical longitudinal center plane of the vehicle, two propulsion unit rotating shafts 10 are disposed on opposite sides of the longitudinal center plane. For steering the vehicle, a front wheel 62, which can be turned by means of a handlebar, is provided in the longitudinal center plane of the vehicle at a distance from the propulsion unit rotating shaft. In this way, a three-wheel and three-track vehicle is formed. Such a vehicle, with conventional driving mechanisms by internal combustion engines, is known in the form of so-called carts. Instead of the one, central front steerable wheel 62, the wheels 62', which can be steered over an axle pivot steering and are indicated additionally by lines of dots and dashes in FIG. 7, can be provided. This results in a four-wheel, two-track vehicle. Such vehicles, driven by internal combustion engines, are known as all-terrain vehicles or also as golf carts.

To control the driving motor of the vehicles, equipped with the inventive propulsion unit rotating shaft 10, during driving operation, electric or electronic control devices, which are not shown here must, of course, be provided.

However, these devices are known and will not be described in greater detail. The electric control may consist of a separate control unit and a power unit. However, these two components can also be combined into an integral unit, which comprises a current regulating unit, the charging unit for the accumulators, a dc/dc converter, a charge monitoring circuit, a charge regulator, as well as an energy indicator. The speed can be controlled by a control grip at the handlebar 64, corresponding to a gas control grip in the case of vehicles driven by internal combustion engines. The control grip is adjusted over a Bowden wire, a potentiometer or also a controller (current adjuster) in the electrical control circuit. A circuit, which reverses the polarity of the electrical connections at the assigned electric motor, as a result of which the latter can be driven in the reverse direction and thus makes backward driving possible, can also be integrated in the electric controls. Devices for blocking the free-running function of the free-running hub or hubs, which are provided in this case, can also be actuated automatically over the electrical control system when the polarity of the electrical connections of the electric motors is reversed.

It has proven to be essential for the operation of a vehicle equipped with the inventive propulsion unit rotating shaft that the driving motor be uncoupled from the driving wheel when the vehicle is traveling downhill or is being braked. By these means, it is ensured that the driving motor 14 is not forcibly driven by the driving wheel and does not act as a generator. Especially when driving downhill, the driving motor would generate high currents, which could lead to damage to or even destruction of the accumulators carried along, if they were to be fed back directly back to the accumulators. This is prevented by the inventively provided uncoupling of the driving motor 14 from the driving wheel 18 in the pushing operation by the known free-running hub 38 or optionally by an additional free-running hub 38*a*, provided between the driving motor 14 and the driving wheel 18. Due to the phases of the pushing operation, which occur in the normal driving operation of vehicles, the removal of current from the accumulators is, in each case, interrupted. It has turned out that the interruption of the removal of current from the accumulators has a positive effect on their service life and energy yield. Due to the special arrangement of the free-running hub 38 between the transmission trains 26*a* and 26*b*, the latter can be disposed in a central region of the housing 12 of the rotating shaft, where it is easily accessible for maintenance and repair purposes due to the presence of a removable housing lid, which is not shown. A further advantage of this arrangement consists therein that the rpm of the part of the free-running hub, which continues to rotate with the driving wheel in the pushing operation, is considerably lower than that of a free-running hub disposed on the motor side and thus the stress, acting when the driving mechanism of the motor sets in once again, is reduced.

What is claimed is:

1. A swinging arm motor unit having a rotating shaft (10) for single track or multiple track vehicles comprising an electric driving motor (14) disposed in a region of one end of an extended swinging transmission housing (12) and a wheel hub (16) for holding a driving wheel (18) of the vehicle mounted rotatably in a region of the other end of the swinging transmission housing, the electric driving motor (14) having a drive shaft passing into the swinging transmission housing (12) and forming a positive coupling with the wheel hub (16) of the driving wheel of the vehicle by a transmission device (26) encapsulated in the swinging transmission housing (12), the swinging transmission housing (12) being pivotably mounted about an axis at a distance from the axis of rotation of the wheel hub (16) and the swinging transmission housing extending parallel to the frame (52) or chassis (54) of the vehicle, and at least one overriding clutch being provided which cancels the positive coupling between the driving motor (14) and the driving wheel (18) of the vehicle when a driving moment initiated in the transmission device (26) by the driving motor (14) is smaller than a torque acting from the driving wheel (18) of the vehicle over the wheel hub (16) on the transmission device, wherein the transmission device (26) has at least two transmission trains (26*a*, 26*b*), each constructed as a belt or chain drive, which are connected in series, and one of the overriding clutches is connected between the two transmission trains (26*a*, 26*b*).

2. The swinging arm motor unit of claim 1, wherein a further overriding clutch is disposed in the driving motor (14) between the drive shaft and the transmission device (26).

3. The swinging arm motor unit of claim 1, wherein a plurality of overriding clutches are provided, one of which is provided in the coupling region between the driving motor (14) and the transmission device (26) and another of which is provided in the region between the transmission device (26) and the wheel hub (16).

4. The swinging arm motor unit of claim 1, wherein the electric driving motor (14) is disposed at the swinging transmission housing (12) with the axis of rotation of the driving motor (14) parallel to the axis of rotation of the wheel hub (16) for the driving wheel (18) of the vehicle and wherein the swinging transmission housing (12) is pivotably mounted to the frame (32) or the chassis (54) of the vehicle, so the axis of rotation of the driving motor (14) and the pivoting axis of the swinging arm motor unit (10) essentially coincide.

5. The swinging arm motor unit of claim 1, wherein the electric driving motor (14) is an axial field motor.

6. The swinging arm motor unit of claim 1, wherein the housing of the electric driving motor (14) has an inlet and an outlet (40, 42), through which cooling air flows.

7. The swinging arm motor unit of claim 6, wherein the cooling air flows through a filter device before flowing through the air inlet (40) of the electric driving motor (14).

8. The swinging arm motor unit of claim 1, wherein the electric driving motor (14) is liquid cooled.

9. The swinging arm motor unit of claim 1, wherein the overriding clutch or clutches are of the clamp-type or sleeve-type.

10. The swinging arm motor unit of claim 1, further comprising devices for blocking a free-running function of the overriding clutch or clutches.

11. The swinging arm motor unit of claim 1, wherein several overriding clutches (38*a*, 38*b*) are provided, of which one is provided in the coupling region between the driving motor (14) and the transmission device (26) and another is provided in the transmission device itself.

12. The swinging arm motor unit of claim 1 wherein the at least two transmission trains (26*a*, 26*b*) are constructed as a positive belt or chain drive.

13. The swinging arm motor unit of claim 1 wherein the at least two transmission trains (26*a*, 26*b*) are constructed as a non-positive belt or chain drive.

14. A motor scooter (50) equipped with the swinging arm motor unit (10) of claim 1 pivotably mounted therein, further comprising a metal profile frame (52) carrying a steering head (58) having a bearing seat for a front wheel suspension at a front end, and a bench seat (56) in a rear region above the swinging arm motor unit, the frame (52) having two metal profiles (66), which are laterally spaced apart at a distance from one another transversely to a driving direction of the scooter, said profiles constructed as closed tubular profiles fastened together at the steering head (58) and each projecting approximately parallel to one another and obliquely from the steering head (58) diagonally in a downwards direction, then in a horizontal direction, and then in an upwards direction wherein between the metal profiles seats are provided for accumulators (70) and at least one tub (72) is fastened to the metal profiles (66).

15. The scooter of claim 14, wherein the metal profiles (66) have either a rectangular or a half-round tubular cross-section.

* * * * *